United States Patent
Towler

(10) Patent No.: US 6,651,607 B2
(45) Date of Patent: Nov. 25, 2003

(54) CONNECTING ROD WITH INCREASED EFFECTIVE LENGTH AND ENGINE USING SAME

(76) Inventor: Kenneth L. Towler, 1114 Wallington Ct., Conyers, GA (US) 30012

( * ) Notice: Subject to any disclaimer, the term of this patent is extended or adjusted under 35 U.S.C. 154(b) by 35 days.

(21) Appl. No.: 10/023,218

(22) Filed: Dec. 18, 2001

(65) Prior Publication Data

US 2002/0088426 A1 Jul. 11, 2002

Related U.S. Application Data

(60) Provisional application No. 60/256,906, filed on Dec. 18, 2000.

(51) Int. Cl.[7] ................................................ F02B 75/32
(52) U.S. Cl. ................ 123/197.3; 123/48 B; 123/78 E; 123/197.2
(58) Field of Search ................ 123/197.3, 197.2, 123/48 B, 78 BA, 78 E, 193.6, 197.4

(56) References Cited

U.S. PATENT DOCUMENTS

| | | | | |
|---|---|---|---|---|
| 3,695,150 A | * | 10/1972 | Salzmann | ................... 92/169.1 |
| 3,908,623 A | * | 9/1975 | McWhorter | ............... 123/197.2 |
| 4,254,743 A | | 3/1981 | Reid et al. | |
| 4,463,710 A | * | 8/1984 | McWhorter | ............... 123/48 B |
| 4,584,972 A | * | 4/1986 | Jayne et al. | ............. 123/197.4 |
| 4,791,898 A | * | 12/1988 | Jayne | ....................... 123/197.4 |
| 5,115,725 A | | 5/1992 | Horiuchi | |
| 5,156,121 A | | 10/1992 | Routery | |
| 5,413,074 A | | 5/1995 | Horiuchi | |
| 5,427,067 A | | 6/1995 | Horiuchi | |
| 5,794,582 A | * | 8/1998 | Horiuchi | ................... 123/197.2 |

* cited by examiner

Primary Examiner—Willis R. Wolfe
(74) Attorney, Agent, or Firm—Gardner Groff P.C.

(57) ABSTRACT

A crankshaft 12, a piston 14, and a connecting rod 16 coupling the piston to the crankshaft. The piston 14 has an arcuate track slot 40 that receives and guides a rider pin 42 coupled to the connecting rod 16. The rider pin 42 travels side-to-side along the arcuate track slot 40 as the piston 14 reciprocates so that the connecting rod 16 pivots about the center of curvature 48 of the arcuate track slot, which is above the piston 14. In this way, the connecting rod 16 has an effective length that is greater than its actual length, and its maximum angle at mid-stroke is reduced, resulting in increased power transmitted to the crankshaft 12.

23 Claims, 4 Drawing Sheets

CONNECTING ROD WITH INCREASED EFFECTIVE LENGTH AND ENGINE USING SAME

CROSS-REFERENCE TO RELATED APPLICATION

This application claims the priority benefit of U.S. Provisional Patent Application No. 60/256,906, filed on Dec. 18, 2000, which is hereby incorporated by reference in its entirety.

TECHNICAL FIELD

The present invention relates generally to internal combustion engines and, in particular, to a connecting rod and piston used in such an engine.

BACKGROUND OF THE INVENTION

Internal combustion (IC) engines are in widespread use throughout the world. In a typical IC engine, a rotatable crankshaft is coupled to a reciprocating piston by a connecting rod. The connecting rod transfers power to the crankshaft when fuel is burned in the piston cylinder.

The length of the connecting rod has a significant impact on the performance of the engine. In part this is because the connecting rods in most conventional IC engines do not reciprocate in an exactly linear motion, but instead the motion has an angular component. This angular component results from the lower end of the connecting rod rotating through a path that is concentric to and radially spaced from the crankshaft axis. In other words, when the piston is at mid-stroke, the lower end of the connecting rod is positioned at the side of the crankshaft. In this position, the connecting rod forms an angle relative to the position of the connecting arm when the piston is at top or bottom dead center. Because of this angle, when driving the crankshaft some of the power from combustion is lost due to the force being delivered at the angle and due to any angular deflection of the connecting rod. But by increasing the length of the connecting rod, the angle of the connecting rod at mid-stroke is decreased, and a greater percentage of the available power from the combustion is transmitted to the crankshaft.

Unfortunately, there are physical design constraints on the length of the connecting rod. Most connecting rods have cylindrical bores in their lower and upper ends. The upper end bore is aligned with a cylindrical bore in the piston, and they receive a cylindrical wrist pin to pivotally couple them together. The wrist pin ordinarily needs to be positioned below the piston rings on the piston. This limits the position of the upper end of the connecting arm. Also, the position of the lower end of the connecting rod at the crankshaft is limited by the position of the crankshaft. And just spacing the piston and crankshaft further apart so that a longer connecting rod can be used requires using a bigger engine block, which is often not a satisfactory option due to the increased size and costs of the engine.

Accordingly, it can be seen that a need yet remains in the art for an improved connecting rod and piston arrangement that reduces the angular component of the motion of the connecting rod, thereby increasing the power transmitted to the crankshaft. Furthermore, there remains a need for such a connecting rod and piston arrangement that provides a substantially increased effective length of the connecting rod, thereby reducing the angular component and providing improved power. It is to the provision of such an arrangement that the present invention is primarily directed.

SUMMARY OF THE INVENTION

Briefly described, the present invention comprises an internal combustion engine having a crankshaft, a reciprocating piston with a crown, and a connecting rod coupling the crankshaft with the piston. The connecting rod has an upper end coupled to the piston and a lower end coupled to the crankshaft. The lower end can be coupled to the crankshaft by conventional practice.

The upper end is coupled to the piston by a rider that engages and is guided by an arcuate track formed in or on the piston. The arucate track has a center of curvature that defines an upper pivot axis that is above the piston crown. In this way, the connecting rod moves back-and-forth along the arcuate track as it reciprocates with the piston, so that the connecting rod pivots about the upper pivot axis. By pivoting about this axis above the piston crown, the connecting rod has an effective length that is longer that its actual length, and the maximum angle of the connecting rod is reduced relative to those used in known engines. This results in more leverage, therefore, more of the power produced by the combustion in the piston is transferred by the connecting rod to the crankshaft.

In a first exemplary embodiment of the invention, the arcuate track is provided by two (or another number of) arcuate slots in the piston, with the connecting rod upper end positioned between them. Each slot has a lower inner arcuate surface and a generally concentric upper inner arcuate surface. Also, the rider is provided by at least one rider pin with ends that extend from the connecting rod upper end and are received into the arcuate slots. For example, the rider pin can be provided by a bar having a lower arcuate surface and an upper arcuate surface, the surfaces generally concentric with each other and with the slot arcuate surfaces. Additionally, the rider pin can have a hollow shape. Furthermore, the upper end of the connecting rod can have a cavity that receives the rider pin through it so that the rider pin and upper end move together. Other arcuate track and rider arrangements that produce an upper pivot axis above the piston crown for the connecting rod can be suitably employed. Also, other rider pin shapes and structures can be used that permit the rider pin to move back-and-forth along the track.

In a second exemplary embodiment of the invention, the rider pin is solid and thinner between its arcuate surfaces. Also, the rider pin is mounted to a top surface of the connecting rod upper end by conventional fasteners. In this way, the material cost and weight of the rider pin and connecting rod are reduced.

In a third exemplary embodiment of the invention, the rider pin is solid but has a first cavity in its lower arcuate surface that receives the connecting rod end for mounting. The rider pin has a second cavity in one of its ends, and the connecting rod upper end has holes in it that align with the second cavity to receive conventional fasteners. In this way, the connecting rod can be manufactured using standard connecting rod blanks.

An alternative way of stating the invention is that it includes an improvement in an IC engine. The improvement comprises coupling the connecting rod to the piston so that the connecting rod pivots about the upper pivot axis that is above the crown of the piston. For example, the piston can include the arcuate track, and the non-cylindrical rider can be guided along the track and coupled to the connecting rod.

Accordingly, the present invention provides an IC engine with a connecting rod coupled to the piston so that, as it reciprocates with the piston, it pivots about an upper axis point above the piston crown. Thus, the connecting rod has a longer effective length than its actual length because it pivots to a smaller maximum angle than conventional connecting rods. With the connecting rod kept more in-line and deflected less, a greater percentage of the available power from the combustion is transmitted to the crankshaft. This results in a noticeable increase in engine horsepower.

BRIEF DESCRIPTION OF THE DRAWING FIGURES

DETAILED DESCRIPTION OF THE EXEMPLARY EMBODIMENTS

Figure 1:
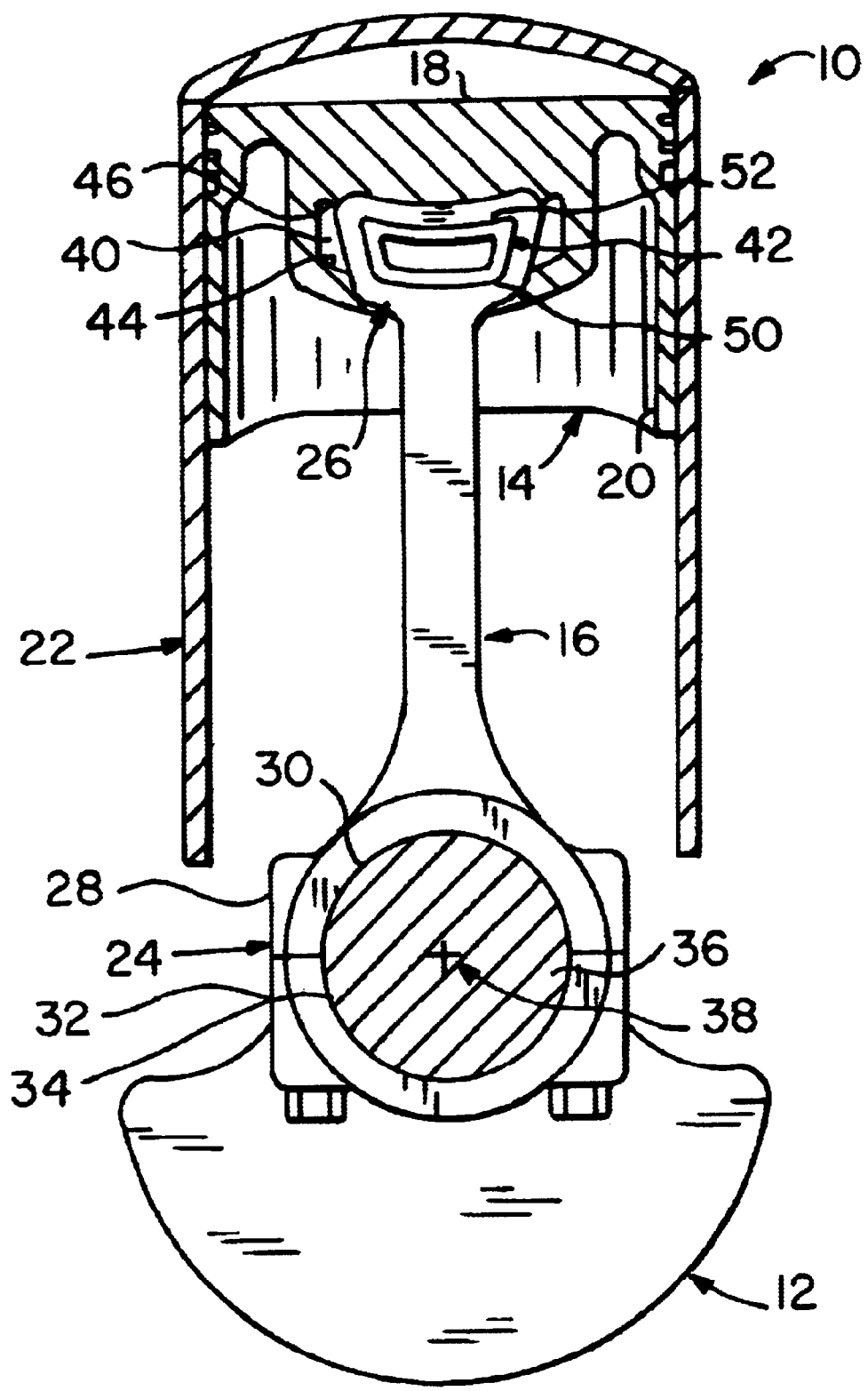
FIG. 1 is a cross-section view of a portion of an IC engine according to a first exemplary embodiment of the present invention, showing a connecting rod and a piston.
Figure 2:
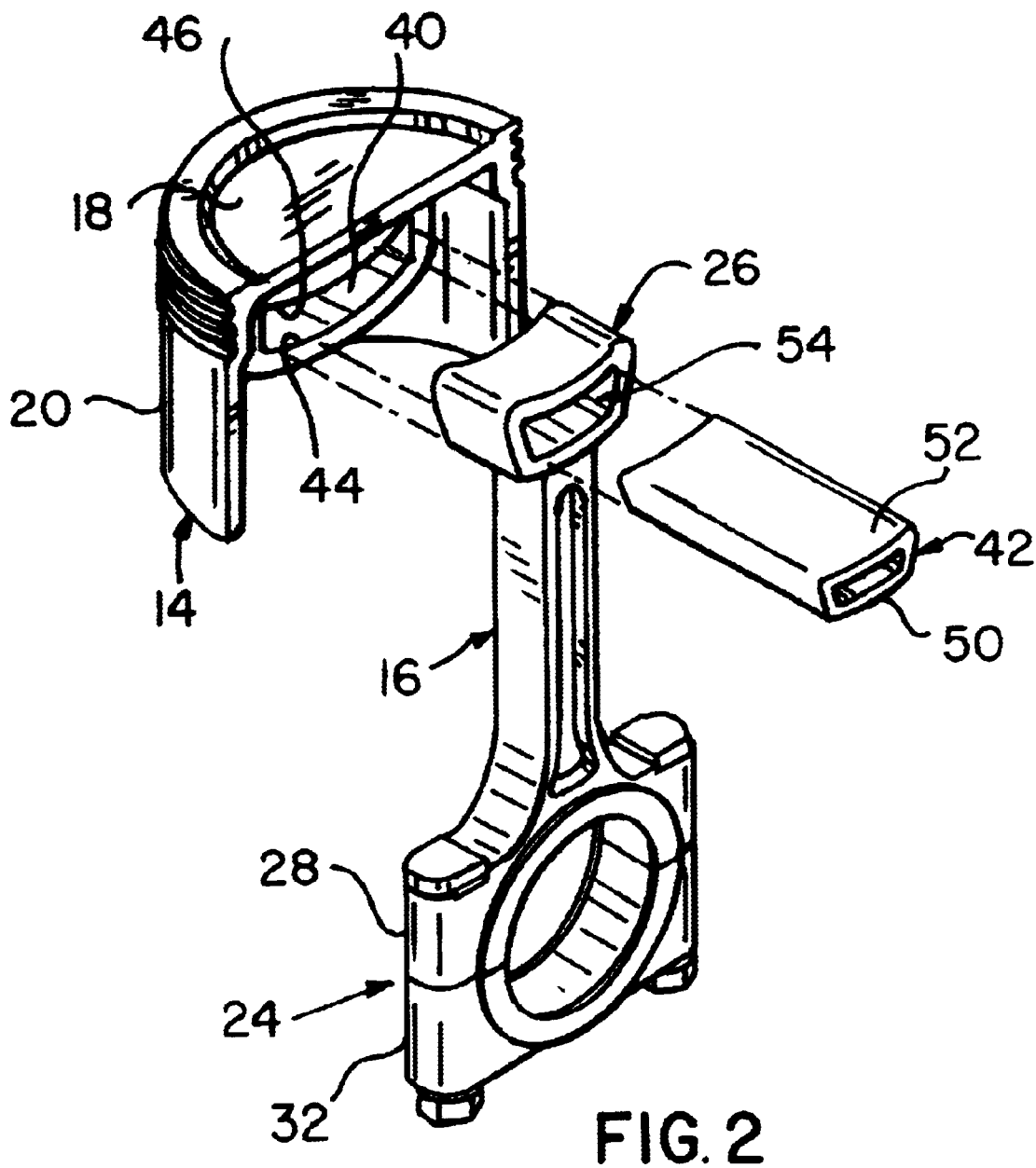
FIG. 2 is an exploded perspective view of the connecting rod and piston of FIG. 1, with a portion of the piston cutaway for showing how they are coupled together.

Referring now to the drawing figures, wherein like reference numerals represent like parts throughout the several views, FIGS. 1 and 2 show a portion of an IC engine of an exemplary embodiment of the present invention, generally referred to as the engine 10. The engine 10 has a rotatable crankshaft 12, a reciprocating piston 14, and a connecting rod 16 coupling the crankshaft with the piston. The piston 14 has a crown 18 and a skirt 20 below the crown, and reciprocates in a cylinder 22. In typical commercial embodiments, the engine 10 has four or six or another number of the pistons 14 coupled to the crankshaft 12.

Additionally, the engine 10 typically includes a fuel system for delivering fuel to the cylinder 22 for combustion, an ignition system for igniting the fuel in the cylinder 22, an exhaust system for exhausting the products of combustion from the cylinder 22, a lubrication system for maintaining the desired levels of friction between the piston 14 and the cylinder 22, and a cooling system for maintaining the desired temperature levels in the engine 10. These systems are not shown in the drawing figures, but such systems are conventional and understood by those skilled in the art.

Referring now to the details of the connecting rod 16, it has a lower end 24 that is coupled to the crankshaft 12 and an upper end 26 that is coupled to the piston 14. The lower end 24 has a base 28 with a semi-circular bore 30 and a cap 32 with a semi-circular bore 34. The lower end bores 30 and 34 cooperate to receive a throw rod 36 of the crankshaft 12, thereby coupling the lower end 24 to the crankshaft 12. This is the conventional way of coupling connecting rods to crankshafts, but other coupling arrangements can be suitably employed. In any way, the connecting rod 16 is thereby provided with a lower pivot axis 38.

On the other hand, the upper end 26 of the connecting rod 16 is coupled to the piston 14 in a unique way. The uniqueness includes the piston 14 having an arcuate track that is positioned below the piston crown 18 and that guides a rider coupled to the upper end 24 of the connecting rod 16. The arcuate track can be provided by, for example, two aligned slots that are cut or otherwise formed in or through the piston 14, with the connecting rod upper end 26 positioned between the slots. Also, the track has a lower arcuate surface 44 and a generally concentric upper inner arcuate surface 46. These generally concentric arcuate surfaces 44 and 46 provide the arcuate track with a center of curvature that is above the piston crown 18. This center of curvature defines an upper pivot axis 48 (see FIG. 4), the significance of which will be discussed in more detail below. The term "generally concentric" as used herein means exactly concentric or very nearly concentric but slightly non-concentric to allow for the hydrodynamic wedge effect of a lubricant on the surfaces.

Referring now to the rider, it engages the track surfaces 44 and 46, which guide it along the track. Where the track is provided by the slots 40, the rider can be provided by, for example, a rider pin 42 with its two ends extending from opposite sides of the connecting rod upper end 26 and each one received into one of the slots. Also, the rider pin 42 can have the form of a bar with a lower arcuate surface 50 and a generally concentric upper inner arcuate surface 52, both of which are also generally concentric with the track arcuate surfaces 44 and 46. Additionally, the width of the rider pin 42 is less than the width of the arcuate track 40, thereby permitting the rider pin to slide within the wider track. To assist the rider pin 42 in sliding along the track 40, lubrication, bearings, or other friction-reducers can be provided. Furthermore, the rider pin 42 can be hollow in cross-section to minimize material costs and weight.

Figure 4:
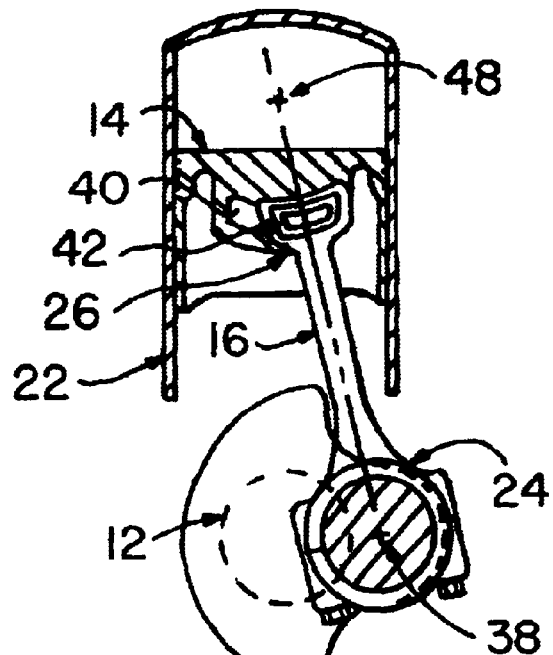
FIG. 4 is a cross-section view of the connecting rod and piston of FIG. 3, showing the piston at mid-stroke causing 90 degrees of crankshaft rotation.

Because the track slot 40 is arcuate, the rider pin 42 slides along a curved path with the aforementioned center of curvature and upper pivot axis 48 (see FIG. 4). Thus, the upper end 26 of the connecting rod 16 can slide from side to side along the curved path, guided by the arcuate track slot 40, as the connecting rod 16 reciprocates with the piston 14. As the upper end 26 slides back and forth along the arcuate track slot 40, the connecting rod 20 pivots about the upper pivotal axis 48, which is above the piston crown 18. In this way, the connecting rod 16 has an effective length that is greater than its actual length. The result is that the maximum angle of the connecting rod 16 is reduced, allowing the engine 10 to produce more power. As used herein, the term "effective length" refers to the distance between the lower pivot axis 38 and the upper pivot axis 48 of the connecting rod 16.

Referring now to the coupling of the rider pin 42 to the connecting rod 16, the upper end 26 can have an opening 54 defined in it that is sized and shaped to receive the rider pin 42. For example, the opening 54 can have an arcuate shape conforming to that of the rider pin 42. The rider pin 42 extends through the opening 54 with the ends of the rider pin extending out from the upper end 26. The rider pin 42 can be held in the opening 54 by friction (an interference fit) and/or by conventional fasteners.

Now that the engine components have been detailed, their operation will be described with reference to FIGS. 3–6.

Figure 3:
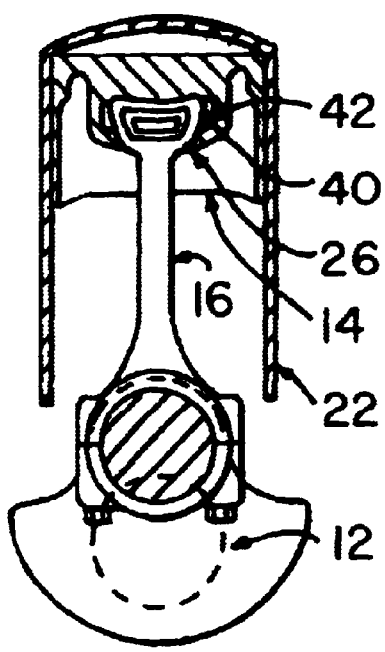
FIG. 3 is a cross-section view of the connecting rod and piston of FIG. 1, showing the piston at top dead center of its stroke.

FIG. 3 shows the piston 14 at top dead center of its stroke, with the connecting rod 16 positioned along the line between the crankshaft 12 and the piston. The rider pin 42 and the connecting rod upper end 26 are positioned in about the center of the arcuate track slots 40.

In FIG. 4, the crankshaft 12 has been rotated clockwise 90 degrees by the expanding combustion gases in the cylinder 22. In so rotating the crankshaft 12, the connecting rod 16 has been moved to its maximum angle relative to its position in FIG. 3. But the rider pin 42 and the connecting rod upper end 26 have moved to about the edge of the track slots 40, so the angle is less than it would be if the rider pin were pivotally attached to the piston 14 at a fixed location. Thus, the connecting rod 16 effectively pivots about the upper pivot axis 48 defined by the generally concentric arcuate surfaces of the track, providing an effective length of the connecting rod that is longer than its actual length.

This lesser maximum angle of the connecting rod 16 provides more leverage on the crankshaft 12. More leverage means that more power is produced for the same amount of combustion pressure on the piston 14. Also, the reduced maximum angle allows a longer dwell time at top dead center of the stroke. This allows more pressure to build up on the piston 14 before it begins its descent on the power stroke, thereby increasing power output.

Figure 5:
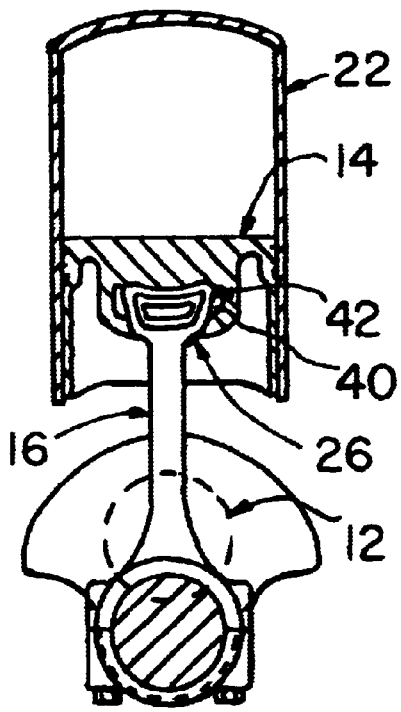
FIG. 5 is a cross-section view of the connecting rod and piston of FIG. 3, showing the piston at bottom dead center of its stroke causing 180 degrees of crankshaft rotation.

Referring to FIG. 5, the crankshaft 12 has now been rotated clockwise 180 degrees by the piston 14, which is now at bottom dead center of its stroke. In so rotating the crankshaft 12, the connecting rod 16 has moved back to along the line between the crankshaft 12 and the piston 14. The rider pin 42 and the connecting rod upper end 26 are now back in about the center of the track slots 40.

Figure 6:
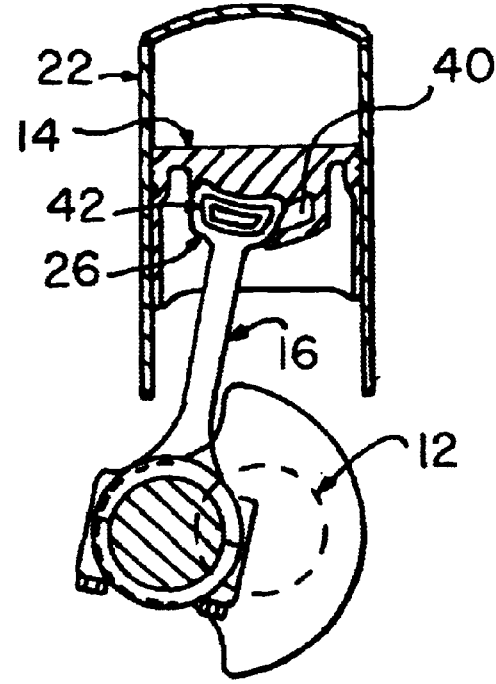
FIG. 6 is a cross-section view of the connecting rod and piston of FIG. 3, showing the piston at mid-stroke causing 270 degrees of crankshaft rotation.

Referring to FIG. 6, the crankshaft 12 is further rotated clockwise to 270 degrees by the reciprocating piston 14. In so rotating the crankshaft 12, the connecting rod 16 has again moved to its maximum angle relative to its position in FIGS. 3 and 5. This maximum angle is equal to but opposite from that of FIG. 4. Also, the rider pin 42 and the connecting rod upper end 26 have now moved to about the opposite edge of the track slots 40. This results in the longer effective length of the connecting rod 16 and the related benefits described above with reference to FIG. 4.

A number of alternative forms of the first exemplary embodiment provide the same or similar advantages. In one alternative form, the arcuate track is provided by two arcuate flanges extending from the piston, the connecting rod upper end is positioned between the flanges, and the rider is provided by two arcuate channels each one formed into or extending from one side of the connecting rod upper end and receiving one of the arcuate flanges therein. In another alternative, the arcuate track is provided by only one arcuate slot or flange, and the rider pin or channel extends from or is formed in only one side of the connecting rod upper end. Other arcuate track and rider arrangements that produce an upper pivot axis above the piston crown for the connecting rod can be suitably employed.

In a further alternative, the rider is integrally formed on the upper end of the connecting rod. In yet another alternative, the lower end of the connecting rod is coupled to the crankshaft by an arcuate track and rider assembly similar to one of those described herein. In still another alternative, the rider pin has a cylindrical shape and/or is provided by two or more cylindrical pins. Also, other non-cylindrical rider pin shapes can be used that permit the rider pin to move back-and-forth along the track.

Figure 7:
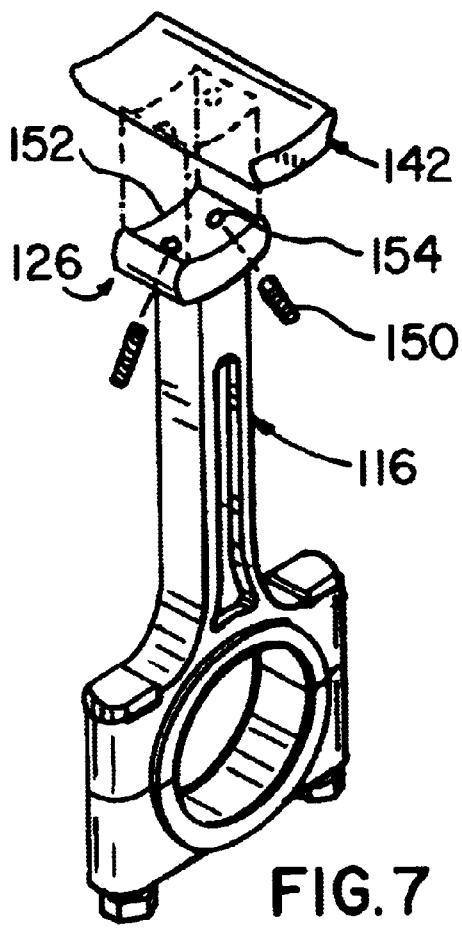
FIG. 7 is an exploded perspective view of a connecting rod and piston according to a second exemplary embodiment of the present invention.

In a second exemplary embodiment of the invention as shown in FIG. 7, the rider pin 142 is solid (instead of hollow) and thinner between its arcuate surfaces. Also, the rider pin 142 is mounted to a top surface 152 of the upper end 126 of the connecting rod 116 (instead of received in an opening in the upper end). The rider pin 142 can be so mounted by conventional fasteners 150 received through mounting holes 154 in the top surface 152. For example, the fasteners 150 can be provided by threaded machine bolts or set screws received in the mating threaded mounting holes 154, or by pins that are heated, installed into holes in the upper end 126, and that upon cooling conform themselves to the holes. Alternatively, other fasteners and/or fastening techniques can be suitably employed to mount the rider pin 142 to the connecting rod upper end 126. In this way, the material cost and weight of the rider pin 142 and connecting rod 116 are reduced.

Figure 8:
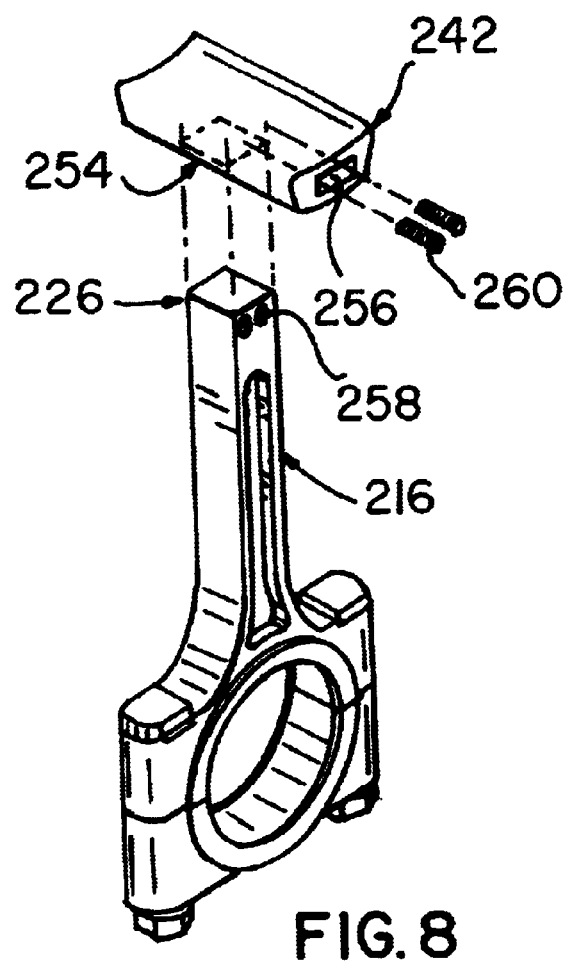
FIG. 8 is an exploded perspective view of a connecting rod and piston according to a third exemplary embodiment of the present invention.

In a third exemplary embodiment of the invention as shown in FIG. 8, the rider pin 142 is solid (instead of hollow) but has a cavity 254 in its lower arcuate surface that receives the upper end 226 of the connecting rod 216 for mounting. Also, the rider pin 142 has mounting holes 256 in one of its ends, and the upper end 226 of the connecting rod 216 has mounting holes in it that align with the mounting holes 256 to receive conventional fasteners 260. The fasteners 258 can be provided by, for example, fasteners similar to those used in the second exemplary embodiment described above. In this way, the connecting rod 116 can be manufactured using standard connecting rod blanks.

An alternative way of characterizing the present invention is that it includes an improvement in an IC engine. The improvement comprises coupling the connecting rod to the piston so that the connecting rod pivots about the upper pivot axis that is above the crown of the piston. For example, the piston can include the arcuate track, and the non-cylindrical rider can be guided along the track and coupled to the connecting rod.

In manufacturing the above-described components, they can be made of steel, aluminum, composites, or other materials selected for strength and durability when used at the operating temperatures and pressures of the engine. Also, these components can be made by conventional forging, casting, machining, and/or other fabrication techniques.

Accordingly, the present invention provides an IC engine with a connecting rod coupled to the piston so that, as it reciprocates with the piston, it pivots about an upper axis that is above the piston crown. Thus, the connecting rod pivots to a smaller maximum angle than conventional connecting rods, providing a longer effective length than its actual length. The result is that more of the power produced by the combustion is transmitted by the connecting rod to the crankshaft. And this is accomplished by the coupling of the connecting rod upper end to the piston without otherwise needing to alter the connecting rod, the piston, the crankshaft, or any other component of the engine.

In the embodiments described above and the following claims, the use of a singular or plural form of a term is not intended to limit the term to that form. For example, the words "a," "an," and "one" are not intended to mean "only one" but can also mean "more than one." Furthermore, while the invention has been disclosed in exemplary forms, those skilled in the art will recognize that many modifications, additions, and deletions can be made therein without departing from the spirit and scope of the invention as set forth in the following claims.

I claim:

1. In an internal combustion engine of the type having a rotatable crankshaft, a reciprocating piston with a crown, and a connecting rod coupling the crankshaft to the piston, the improvement comprising:

the piston being pivotally coupled to the connecting rod for pivoting about a pivot axis that is above the piston crown.

2. The improvement of claim 1, wherein the piston has an arcuate track below the piston crown, the arcuate track having a center of curvature defining the pivot axis, and the connecting rod has an upper end with a rider that is guided by the arcuate track.

3. The improvement of claim 2, wherein the arcuate track comprises at least one arcuate slot defined in the piston, the slot having an upper arcuate surface and a lower arcuate surface that guide the rider.

4. The improvement of claim 3, wherein the rider comprises at least one rider pin that extends from upper end of the connecting rod and is received between the upper and lower arcuate surfaces of the slot.

5. The improvement of claim 4, wherein the rider pin has an upper arcuate surface and a lower arcuate surface.

6. The improvement of claim 5, wherein the rider pin has a non-cylindrical shape.

7. An internal combustion engine, comprising:
a rotatable crankshaft;
a cylinder;
a piston that can reciprocate within the cylinder, the piston having a crown and an arcuate track below the piston crown, the arcuate track having a center of curvature defining a pivot axis that is above the piston crown; and
a connecting rod having a lower end coupled to the crankshaft and an upper end coupled to the piston, the upper end having a rider that is guided by the arcuate track, wherein the connecting rod is pivotal about the pivot axis.

8. The engine of claim 7, wherein the arcuate track comprises at least one arcuate slot defined in the piston, the slot having an upper arcuate surface and a lower arcuate surface that guide the rider.

9. The engine of claim 8, wherein the rider comprises at least one rider pin that extends from upper end of the connecting rod and is received between the upper and lower arcuate surfaces of the slot.

10. The engine of claim 9, wherein the rider pin has an upper arcuate surface and a lower arcuate surface.

11. The engine of claim 10, rider pin has a non-cylindrical shape.

12. An apparatus for use in an internal combustion engine having a rotatable crankshaft, the apparatus comprising:
a piston having a crown and an arcuate track below the crown, the arcuate track having a center of curvature defining a pivot axis that is above the crown; and
a connecting rod having a lower end connectable to the crankshaft and an upper end coupled to the piston, the upper end having a rider that is guided by the arcuate track, wherein the connecting rod is pivotal about the pivot axis.

13. The apparatus of claim 12, wherein the arcuate track comprises at least one arcuate slot defined in the piston, the slot having an upper arcuate surface and a lower arcuate surface that guide the rider.

14. The apparatus of claim 13, wherein the rider comprises at least one rider pin that extends from upper end of the connecting rod and is received between the upper and lower arcuate surfaces of the slot.

15. The apparatus of claim 14, wherein the rider pin has an upper arcuate surface and a lower arcuate surface.

16. The apparatus of claim 15, rider pin has a non-cylindrical shape.

17. An apparatus for use in an internal combustion engine having a rotatable crankshaft, the apparatus comprising:
a piston having a crown and at least one arcuate slot defined in the piston below the crown, the slot having an upper arcuate surface, a generally concentric lower arcuate surface, and a center of curvature defining a pivot axis that is above the crown;
a connecting rod having a lower end connectable to the crankshaft and an upper end coupled to the piston; and
a rider pin that extends from the upper end and is received and guided in the arcuate slot, the rider pin having a non-cylindrical shape, an upper arcuate surface, and a generally concentric lower arcuate surface so that the rider pin is closely fitted within the arcuate slot, wherein the connecting rod is pivotal about the pivot axis.

18. The apparatus of claim 17, wherein the rider pin is hollow.

19. The apparatus of claim 17, wherein the at least one arcuate slot comprises two aligned slots, the upper end of the connecting rod is positioned between the slots, and the rider pin has two ends extending from the connecting rod upper end with each one of the ends received in one of the slots.

20. The apparatus of claim 17, wherein the connecting rod upper end has an opening defined therein that receives the rider pin therethrough.

21. The apparatus of claim 20, wherein the opening has an arcuate shape conforming to that of the rider pin.

22. The apparatus of claim 17, wherein the connecting rod has a top surface and the rider pin is mounted to the top surface.

23. The apparatus of claim 17, wherein the lower arcuate surface of the rider pin has a cavity defined therein that receives the upper end of the connecting rod, the rider pin has an end with at least one mounting hole defined therein, and the upper end of the connecting rod has at least one mounting hole therein that is alignable with the rider pin mounting hole to receive conventional fasteners.

* * * * *